(12) United States Patent
Wakabayashi

(10) Patent No.: US 9,766,379 B2
(45) Date of Patent: Sep. 19, 2017

(54) MICROLENS ARRAY SUBSTRATE, ELECTROOPTICAL DEVICE INCLUDING MICROLENS ARRAY SUBSTRATE, PROJECTION TYPE DISPLAY APPARATUS, AND MANUFACTURING METHOD OF MICROLENS ARRAY SUBSTRATE

(71) Applicant: SEIKO EPSON CORPORATION, Tokyo (JP)

(72) Inventor: Junichi Wakabayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

(21) Appl. No.: 14/855,618

(22) Filed: Sep. 16, 2015

(65) Prior Publication Data

US 2016/0097883 A1 Apr. 7, 2016

(30) Foreign Application Priority Data

Oct. 7, 2014 (JP) ................................. 2014-206205

(51) Int. Cl.
*G02F 1/1335* (2006.01)
*G02F 1/1362* (2006.01)
*G02B 3/00* (2006.01)

(52) U.S. Cl.
CPC ......... *G02B 3/0056* (2013.01); *G02B 3/0012* (2013.01); *G02B 3/0068* (2013.01); *G02F 1/1362* (2013.01); *G02F 1/133526* (2013.01)

(58) Field of Classification Search
None
See application file for complete search history.

(56) References Cited

U.S. PATENT DOCUMENTS

| 8,351,127 | B2 * | 1/2013 | Black, Jr. ............. | G02B 3/0087 359/641 |
| 2002/0027715 | A1 * | 3/2002 | Shimizu ........... | B29D 11/00278 359/619 |
| 2003/0227688 | A1 * | 12/2003 | Houlihan ............. | G02B 3/0031 359/619 |

(Continued)

FOREIGN PATENT DOCUMENTS

| JP | 05-341283 A | 12/1993 |
| JP | 2004-101856 | * 4/2004 |

(Continued)

*Primary Examiner* — Ryan Crockett
(74) *Attorney, Agent, or Firm* — Global IP Counselors, LLP

(57) ABSTRACT

A microlens array substrate includes: a light transmitting substrate in which a first lens surface formed of a concave surface is formed on a substrate surface on one side; a first lens layer which covers the substrate surface on one side and has a refractive index which is different from that of the light transmitting substrate; a light transmitting layer which covers the first lens layer on the opposite side to the light transmitting substrate; and a second lens layer which covers the light transmitting layer on the opposite side to the light transmitting substrate and in which a second lens surface formed of a convex surface is formed on the opposite side to the light transmitting substrate, in which the light transmitting layer has smaller refractive index and coefficient of thermal expansion than those of the first lens layer and the second lens layer.

13 Claims, 12 Drawing Sheets

(56) References Cited

U.S. PATENT DOCUMENTS

| | | | | |
|---|---|---|---|---|
| 2004/0211753 A1* | 10/2004 | Shimizu | ............... | G02B 3/0025 |
| | | | | 216/26 |
| 2005/0174649 A1* | 8/2005 | Okada | .................. | G02B 3/0012 |
| | | | | 359/619 |
| 2006/0046486 A1 | 3/2006 | Ozawa | | |
| 2006/0066945 A1* | 3/2006 | Yeo | ...................... | G02B 3/0031 |
| | | | | 359/457 |
| 2006/0195293 A1 | 8/2006 | Koike et al. | | |
| 2007/0085954 A1* | 4/2007 | Terao | ................ | G02F 1/133734 |
| | | | | 349/125 |
| 2009/0257000 A1* | 10/2009 | Ogasawara | .......... | G02B 3/0056 |
| | | | | 349/64 |
| 2014/0376097 A1* | 12/2014 | Yamashita | ........... | G02B 3/0018 |
| | | | | 359/619 |

FOREIGN PATENT DOCUMENTS

| | | | |
|---|---|---|---|
| JP | 2004-101856 | A | 4/2004 |
| JP | 2005-070666 | * | 3/2005 |
| JP | 2005-070666 | A | 3/2005 |
| JP | 2006-235415 | A | 9/2006 |
| JP | 4285373 | B2 | 6/2009 |
| JP | 4518179 | B2 | 8/2010 |
| JP | 2014-089230 | A | 5/2014 |

* cited by examiner

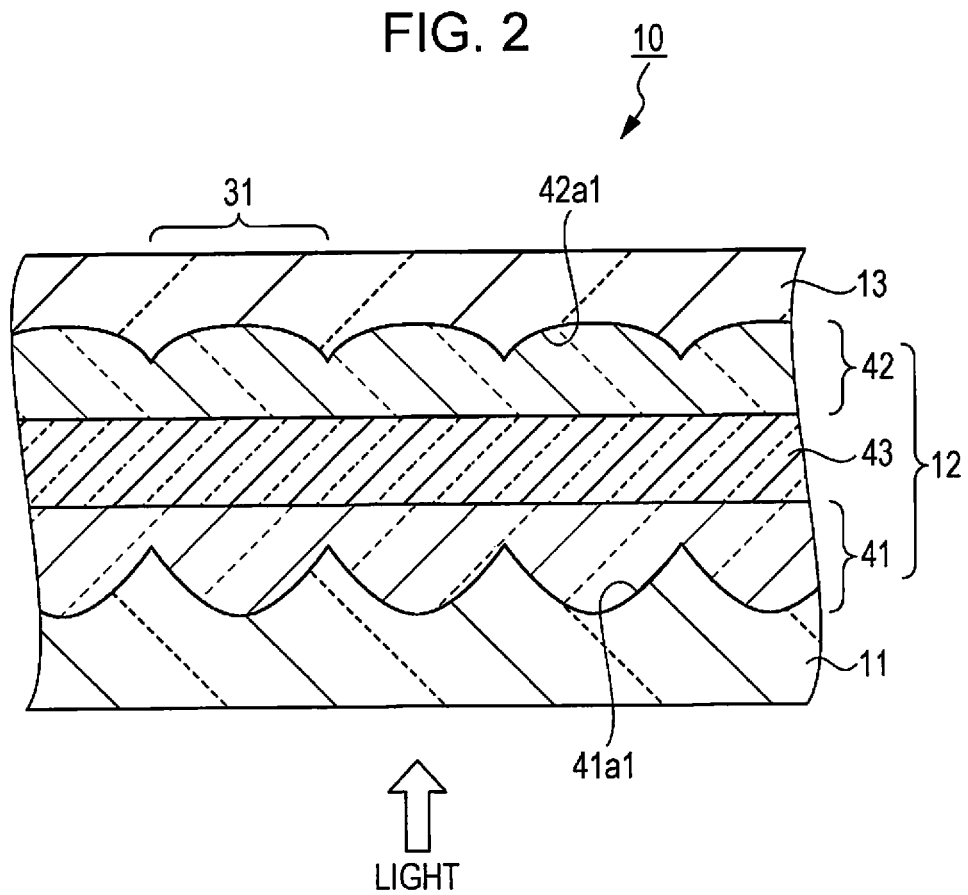

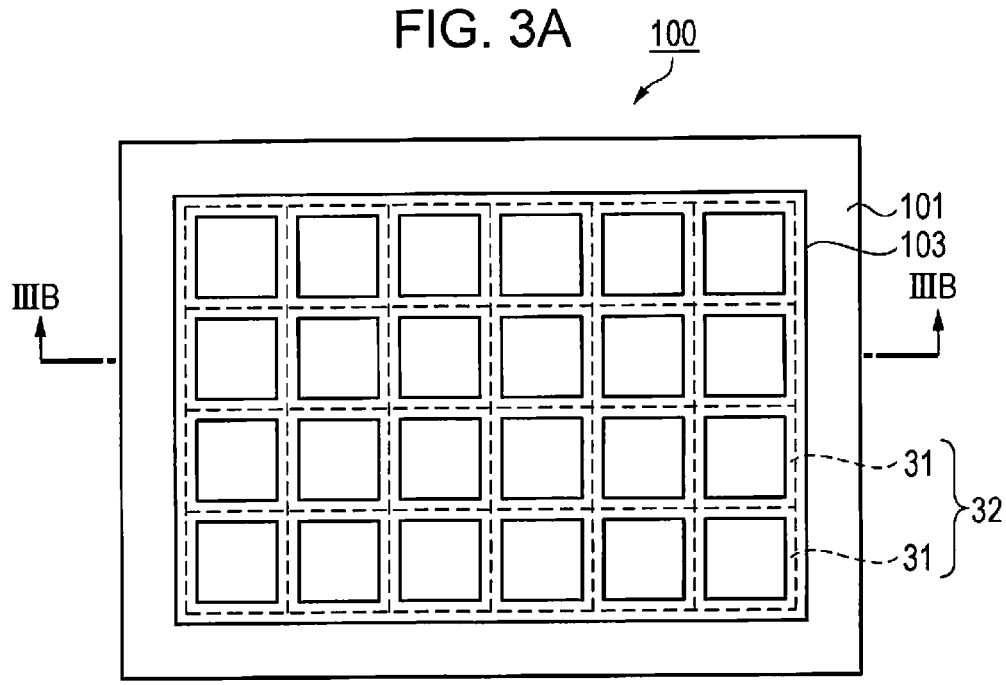
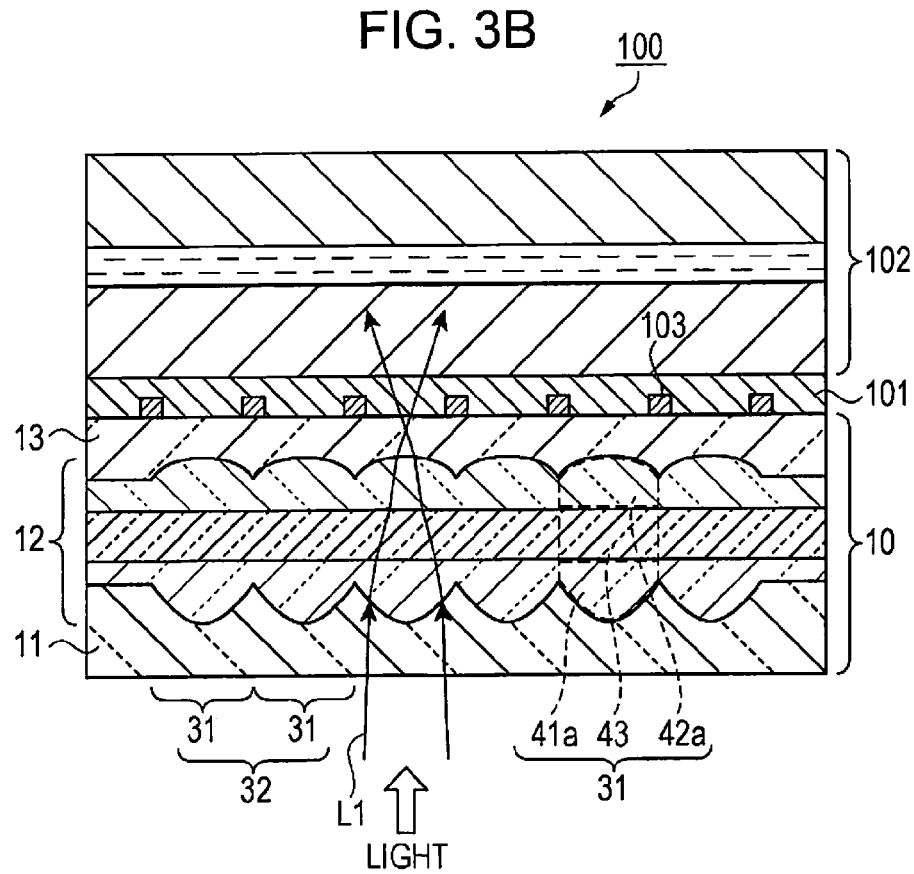

MICROLENS ARRAY SUBSTRATE, ELECTROOPTICAL DEVICE INCLUDING MICROLENS ARRAY SUBSTRATE, PROJECTION TYPE DISPLAY APPARATUS, AND MANUFACTURING METHOD OF MICROLENS ARRAY SUBSTRATE

BACKGROUND

1. Technical Field

The present invention relates to a microlens array substrate, an electrooptical device including a microlens array substrate, a projection type display apparatus, and a manufacturing method of a microlens array substrate.

2. Related Art

As the microlens array substrate, a microlens array substrate in which a plurality of microlenses are arranged on a substrate has been known. The microlens array substrate including a plurality of microlenses, is, for example, disposed between a light source and a liquid crystal light bulb in a liquid crystal projector, and has been used for various purposes such as, for preventing loss of light quantity or increasing an amount of incident light.

JP-A-2014-89230, for example, discloses a microlens array (substrate) including a plurality of first lenses, and a plurality of second lenses each of which is disposed to face each of the first lenses, in order to further increase usage efficiency of light (increase brightness).

However, when a thickness of the microlens array substrate (microlens) increases, the microlens array substrate may be warped or deformed due to thermal expansion. As a result, unevenness or black floating may be generated and display quality may be decreased. In addition, processing variation in the microlens (first lens and second lens) negatively affects the quality of the microlens and the image quality is deteriorated.

SUMMARY

The invention can be realized in the following forms or application examples.

Application Example 1

According to this application example, there is provided a microlens array substrate including a light transmitting substrate in which a first lens surface formed of a concave surface is formed on a substrate surface on one side, a first light transmitting lens layer which covers the substrate surface on one side and has a refractive index which is different from that of the light transmitting substrate, a light transmitting layer which covers the first lens layer on the opposite side to the light transmitting substrate, and a second lens layer which covers the light transmitting layer on the opposite side to the light transmitting substrate and in which a second lens surface formed of a convex surface is formed on the opposite side to the light transmitting substrate, in which the light transmitting layer has smaller refractive index and coefficient of thermal expansion than those of the first lens layer and the second lens layer.

According to this application example, since the light transmitting layer having a smaller refractive index and coefficient of thermal expansion than those of the first lens layer and the second lens layer is disposed between the first lens layer and the second lens layer, a ray incident to the light transmitting layer in an oblique direction is refracted to the oblique side, because the refractive index of the light transmitting layer is small. Accordingly, it is possible to significantly curve the incident light. Therefore, it is possible to set the total film thickness of the microlens array substrate to be small. Thus, it is possible to improve transmittance without lengthening the distance between the lenses. Even when lengthening the distance between the lenses is desirable, since the distance between the lenses is adjusted by the light transmitting layer, it is possible to set the total film thickness of the microlens array substrate to be small and to prevent the microlens array substrate from being warped or deformed, compared to a case of adjusting the first lens layer and the second lens layer to be thick. As a result, it is possible to prevent deterioration in display quality.

Application Example 2

In the microlens array substrate according to the application example, the first lens layer includes a first flattening layer which has a first thickness for flattening an interface between the first lens layer and the light transmitting layer and the same refractive index as the refractive index of the first lens layer, and the second lens layer includes a second flattening layer which has a second thickness for flattening an interface between the second lens layer and the light transmitting layer and the same refractive index as the refractive index of the second lens layer.

According to this application example, since the first flattening layer and the second flattening layer are included, it is possible to prevent negative effects on the first lens surface and the second lens surface, even when processing variations occur when performing the flattening treatment for flattening the interface.

Application Example 3

In the microlens array substrate according to the application example, the first lens layer and the second lens layer has a plurality of refractive index layers having different refractive indexes.

According to this application example, it is possible to change a proceeding direction of light to a desired direction by the plurality of refractive index layers, and to increase the usage efficiency of light.

Application Example 4

In the microlens array substrate according to the application example, curvature of the first lens surface is greater than curvature of the second lens surface.

According to this application example, it is possible to change a proceeding direction of light to a desired direction and to increase the usage efficiency of light.

Application Example 5

In the microlens array substrate according to the application example, the plurality of refractive index layers of the first lens layer are disposed so that the refractive index decreases from the first lens surface to the light transmitting layer side, and the plurality of refractive index layers of the second lens layer are disposed so that the refractive index decreases from the second lens surface to the light transmitting layer side.

According to this application example, it is possible to change a proceeding direction of light to a desired direction by the plurality of refractive index layers, and to increase the usage efficiency of light.

Application Example 6

In the microlens array substrate according to the application example, the side of the first lens layer is an incident side of light with respect to the side of the second lens layer.

According to this application example, since the light is emitted from the side of the first lens surface having a significant curvature, it is possible to cause a direction of scattered light to be close to a desired direction.

Application Example 7

According to this application example, there is provided an electrooptical device including the microlens array substrate according to the Application Examples, and an active matrix substrate disposed by interposing the microlens array substrate and an electrooptical layer.

According to this application example, it is possible to provide an electrooptical device which can improve display quality.

Application Example 8

According to this application example, there is provided a projection type display apparatus including the electrooptical device according to the Application Example.

According to this application example, since the electrooptical device is included, it is possible to provide a projection type display apparatus which can improve display quality.

Application Example 9

According to this application example, there is provided a manufacturing method of a microlens array substrate including forming a concave portion on a first surface of a light transmitting substrate, forming a first lens layer by laminating a material having a greater refractive index than that of the light transmitting substrate on the concave portion, performing flattening treatment for a surface on the opposite side to the light transmitting substrate of the first lens layer, forming a light transmitting layer by laminating a material having smaller refractive index and coefficient of thermal expansion than those of the first lens layer on the flattened surface, and forming a second lens layer by laminating a material having a greater refractive index than that of the light transmitting layer on the light transmitting layer and then forming a surface having a convex shape on the opposite side to the light transmitting layer.

According to this application example, since the light transmitting layer having smaller refractive index and coefficient of thermal expansion than those of the first lens layer is disposed between the first lens layer and the second lens layer, a ray incident to the light transmitting layer in an oblique direction is refracted to the oblique side, because the refractive index of the light transmitting layer is small. Accordingly, it is possible to significantly curve the incident light. Therefore, it is possible to set the total film thickness of the microlens array substrate to be small. Thus, it is possible to improve transmittance without lengthening the distance between the lenses. Even when it is desired to lengthen the distance between the lenses, since the distance between the lenses is adjusted by the light transmitting layer, it is possible to set the total film thickness of the microlens array substrate to be small and to prevent the microlens array substrate from being warped or deformed, compared to a case of adjusting the first lens layer and the second lens layer to be thick. As a result, it is possible to prevent deterioration in display quality.

Application Example 10

In the manufacturing method according to the application example, treatment is performed for remaining a predetermined thickness on the concave portion, when performing the flattening treatment.

According to this application example, since a layer having a predetermined thickness is included, it is possible to prevent negative effects on the surface of the first lens layer, even when processing variations occur when performing the flattening treatment for flattening the interface.

Application Example 11

In the manufacturing method according to the application example, a surface having the convex shape is formed on a layer having a predetermined thickness, when forming the second lens layer.

According to this application example, since a layer having a predetermined thickness is included, it is possible to reliably form the surface of the second lens layer, even when processing variations occur when forming the second lens layer.

Application Example 12

In the manufacturing method according to the application example, a protection layer is formed by laminating a material having a smaller refractive index than that of the second lens layer on the second lens layer.

Application Example 13

The manufacturing method according to the application example, further includes laminating a plurality of materials having different refractive indexes in order, when forming the first lens layer and the second lens layer.

BRIEF DESCRIPTION OF THE DRAWINGS

The invention will be described with reference to the accompanying drawings, wherein like numbers reference like elements.

FIGS. 1A and 1B are schematic views showing a configuration of a microlens array substrate of a first embodiment, in which FIG. 1A is a schematic perspective view showing a configuration of the microlens array substrate and FIG. 1B is a schematic plan view of the microlens array substrate in a top view.

FIG. 2 is a schematic sectional view of the microlens array substrate shown in FIG. 1A taken along line II-II.

FIGS. 3A and 3B are schematic views showing a configuration of a liquid crystal device as an electrooptical device.

DESCRIPTION OF EXEMPLARY EMBODIMENTS

Hereinafter, the embodiments of the invention will be described with reference to the drawings. The drawings used herein are displayed to be appropriately enlarged or contracted so that the described part is recognizable.

In the following embodiments, for example, an expression of "on a substrate" indicates a case where an element is disposed so as to come in contact with the upper portion of the substrate, a case where an element is disposed on a substrate with another element interposed therebetween, or a case where a part of an element is disposed so as to come in contact with the upper portion of the substrate and another part of the element is disposed on the substrate with another element interposed therebetween.

First Embodiment

In the embodiment, an active matrix type liquid crystal device including a thin film transistor (TFT) as a switching element of a pixel will be described as an example of an electrooptical device including a microlens array substrate. This liquid crystal device, for example, can be suitably used as an optical modulation unit (liquid crystal light bulb) of a projection type display apparatus (liquid crystal projector) which will be described later.

Configuration of Microlens Array Substrate

Figure 1A:
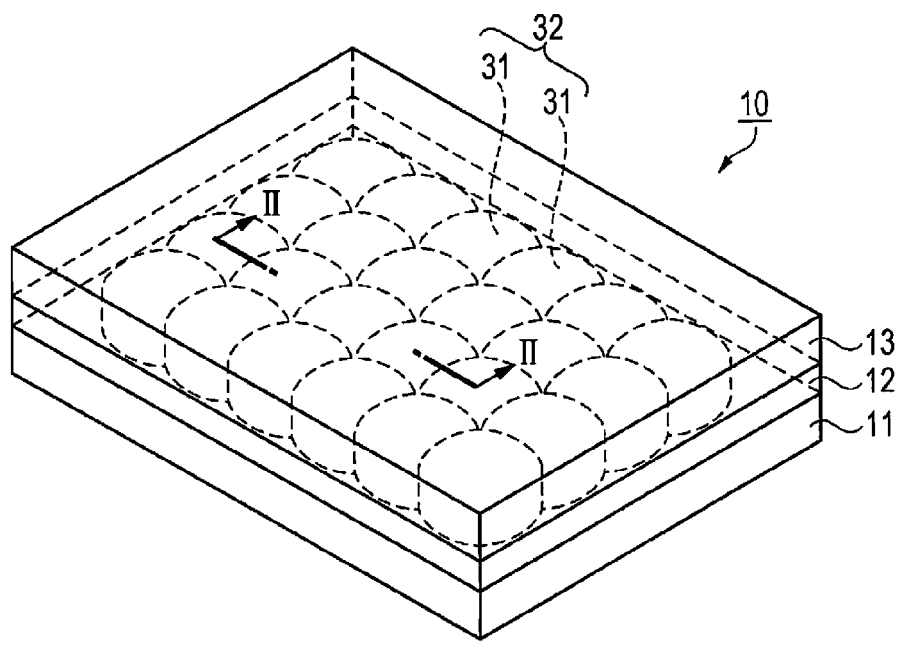
Figure 1B:
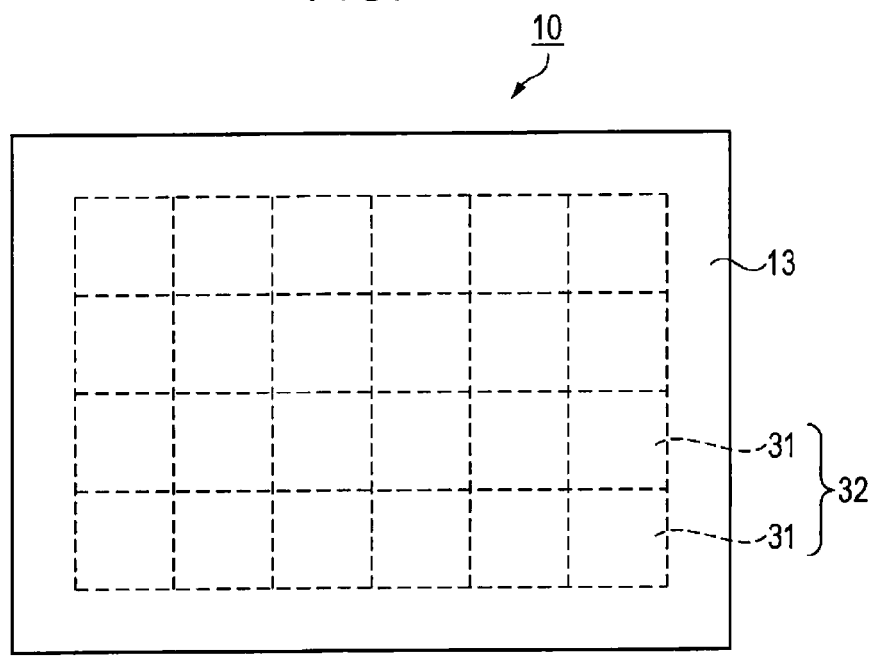

FIGS. 1A and 1B are schematic views showing a configuration of the microlens array substrate. FIG. 1A is a schematic perspective view showing the configuration of the microlens array substrate. FIG. 1B is a schematic plan view of the microlens array substrate of FIG. 1A in a top view. FIG. 2 is a schematic sectional view of the microlens array substrate shown in FIG. 1A taken along line II-II. Hereinafter, the configuration of the microlens array substrate will be described with reference to FIGS. 1A to 2.

As shown in FIGS. 1A to 2, a microlens array substrate 10 includes a light transmitting substrate 11, a lens layer 12 including a plurality of microlenses 31, and a protection layer 13 provided to cover the lens layer 12.

The light transmitting substrate 11 includes a plurality of first lens surfaces 41a1 which are formed of concave surfaces corresponding to the plurality of microlenses 31, and forms a first lens layer 41 by fixing a formation material of the first lens layer 41 configuring the microlenses 31 in the first lens surfaces 41a1.

As a formation material of the light transmitting substrate 11, an inorganic material having high heat resistance and light resistance is used. For example, as the light transmitting substrate 11, a quartz glass substrate having high light transmittance is suitably used.

The lens layer 12 includes the first lens layer 41, a second lens layer 42 including second lens surfaces 42a1 formed of convex surfaces, and a light transmitting layer 43 which is interposed between the first lens layer 41 and the second lens layer 42. The formation material of the second lens layer 42 is fixed in the second lens surfaces 42a1 to form the second lens layer 42.

The first lens layer 41 and the second lens layer 42 have light transmittance and have a higher refractive index than a refractive index of the light transmitting layer 43. That is, the refractive index of the light transmitting layer 43 is small. This is not limited to specific numerical values, but in general, the refractive index of the first lens layer 41 and the second lens layer 42 is approximately 1.54 to 1.80 with respect to light having a wavelength of 550 nm, whereas the refractive index of the light transmitting layer is approximately 1.45 to 1.54. Accordingly, a ray incident to the light transmitting layer 43 in an oblique direction is refracted to the oblique side, because the refractive index of the light transmitting layer is small. As a result, a distance of a ray incident to the microlens array substrate in parallel with a main optical axis, which is refracted by the first lens and condensed is shortened, and it is possible to decrease the thickness of the light transmitting layer 43, compared to a case where only the first lens layer or the second lens layer is deposited between the first lens surfaces 41a1 and the second lens surfaces 42a1.

The light transmitting layer 43 has a smaller coefficient of thermal expansion than that of the first lens layer 41 and the second lens layer 42. The first lens layer 41 and the second lens layer 42 have a higher refractive index than the refractive index of the light transmitting substrate 11 and the protection layer 13.

A method of considering the refractive index of the first lens layer 41 and the second lens layer 42 is a design item and the refractive index thereof is preferably acquired according to a request for the improvement of brightness or consideration of contrast.

The first lens layer 41 and the second lens layer 42 are formed of an inorganic material such as silicon oxynitride (SiON). The refractive index of silicon oxynitride can be controlled to be a refractive index between those of $SiO_2$ and $Si_3N_4$, with the composition (ratio) of oxygen atoms (O) and nitrogen atoms (N).

As a formation material of the light transmitting layer 43, an inorganic material having light transmittance is used. The light transmitting layer 43 is, for example, silicon oxide ($SiO_2$). It is possible to adjust an optical path length to an arbitrary optical path length by changing the thickness of the light transmitting layer 43.

The plurality of microlenses 31 have a biconvex shape which has a convex shape in both directions of a light incident direction and a light emission direction. Boundary lines of the adjacent microlenses 31 come in contact with each other in a plan view and the microlenses have a square shape in a plan view. Such a plurality of microlenses 31 are arranged in a matrix and configure a lens unit 32.

A curvature of the first lens surfaces 41a1 is greater than a curvature of the second lens surfaces 42a1. By performing the setting as described above, it is possible to change a proceeding direction of light to a desired direction and to increase the usage efficiency of light.

The microlens 31 includes the first lens layer 41 which is a part fixed in the light transmitting substrate 11, the second lens layer 42 which is a part covered with the protection layer 13, and the light transmitting layer 43 which is disposed between the first lens layer 41 and the second lens layer 42.

Configuration of Electrooptical Device

Figure 4A:
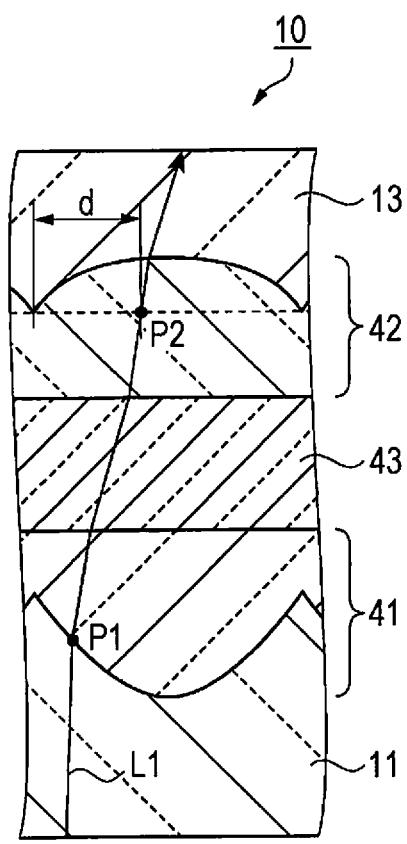
FIGS. 4A and 4B are schematic sectional views comparing structures of the microlens array substrate of the first embodiment and a microlens array substrate of the related art.
Figure 4B:
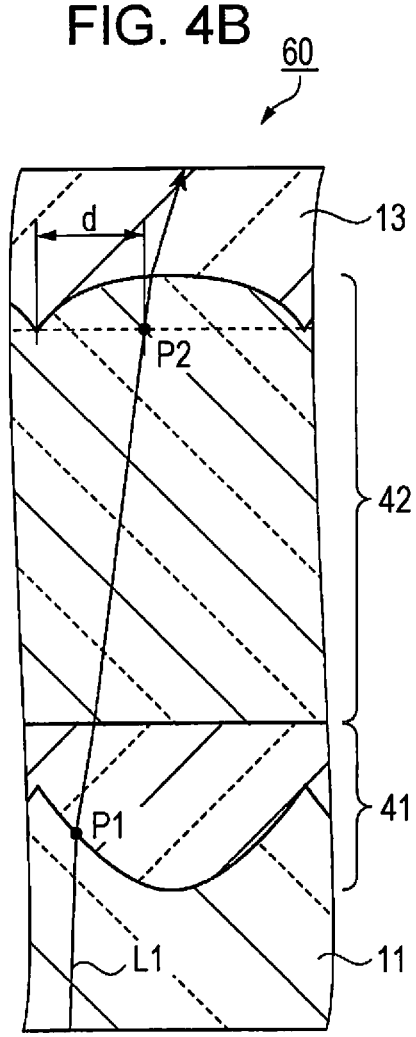

FIGS. 3A and 3B are schematic views showing a configuration of a liquid crystal device as an electrooptical device including the microlens array substrate. FIG. 3A is a schematic plan view showing the configuration of the liquid crystal device. FIG. 3B is a schematic sectional view of the liquid crystal device shown in FIG. 3A taken along line IIIB-IIIB. FIGS. 4A and 4B are schematic sectional views comparing structures of the microlens array substrate of the embodiment and a microlens array substrate of the related art. Hereinafter, the configuration of the liquid crystal device will be described with reference to FIGS. 3A to 4B.

As shown in FIGS. 3A and 3B, in a liquid crystal device 100, the microlens array substrate 10 and a color filter substrate 101 are bonded to each other, and a liquid crystal panel 102 having a liquid crystal layer as an electrooptical layer interposed therein is further bonded thereto. Specifically, the liquid crystal layer is interposed between an active matrix substrate (element substrate) and a counter substrate.

The microlens 31 has a square shape in a plan view which is the same as the planar shape of a black matrix 103 included in the color filter substrate 101, and the boundary line of adjacent microlenses 31 is disposed so as to be overlapped with the black matrix 103 in a plan view.

As shown in FIG. 3B, the microlens array substrate 10 refracts a light ray L1 emitted from the outside on the light transmitting substrate 11 side, by an interface between the light transmitting substrate 11 and the first lens 41a, an interface between the first lens 41a and the light transmitting layer 43, an interface between the light transmitting layer 43 and the second lens 42a, and an interface between the second lens 42a and the protection layer 13 (not shown in the drawings).

The microlens array substrate 10 causes the light ray L1 to be emitted to a liquid crystal panel 102 through the color filter substrate 101 by adjusting a focal point of the microlens 31 to be an optimal location by the light transmitting layer 43 and the protection layer 13.

The configuration shown in FIGS. 3A and 3B are merely an example, and the microlens array substrate 10 may be directly bonded to the liquid crystal panel 102, without using the color filter substrate 101, for example.

FIG. 4A is a schematic sectional view showing the structure of the microlens array substrate of the embodiment. FIG. 4B is a schematic sectional view showing a structure of a microlens array substrate of the related art. In the microlens array substrate 10 of the embodiment and a microlens array substrate 60 of the related art, the shape and the refractive index of the first lens layer 41 and the second lens layer 42 are the same.

As described above, in the microlens array substrate 10 of the embodiment, the light transmitting layer 43 is disposed between the first lens layer 41 and the second lens layer 42. The microlens array substrate 60 of the related art is configured with the first lens layer 41 and the second lens layer 42.

A point of the light ray L1 incident to the first lens layer 41 is, for example, set as P1. This light ray L1 reaches a point P2 which is separated from a lens end of the second lens layer 42 by a distance d.

When both the microlens array substrates 10 and 60 are set to have the points P1 and P2 at the same location (are set to have the same function), the thickness of the second lens layer 42 of the microlens array substrate 60 of the related art is increased. That is, a distance between the lenses is ensured by the second lens layer 42.

However, in the microlens array substrate 10 of the embodiment, since the light transmitting layer 43 is disposed between the first lens layer 41 and the second lens layer 42, it is possible to shorten the distance between the lenses, compared to the case of the microlens array substrate 60 of the related art. Specifically, the oblique light ray is refracted further obliquely due to the interposed light transmitting layer 43, and accordingly, it is possible to shorten the distance between the lenses.

Manufacturing Method of Microlens Array Substrate

FIGS. 5A to 7C are schematic sectional views showing a manufacturing method of the microlens array substrate in the order of steps. Hereinafter, the manufacturing method of the microlens array substrate will be described with reference to FIGS. 5A to 7C.

Figure 5A:
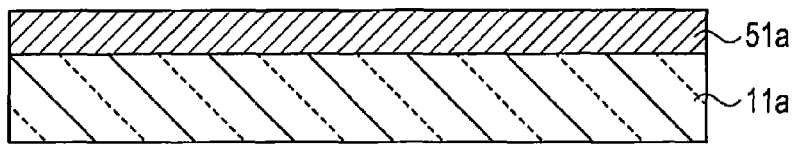
FIGS. 5A to 5E are schematic sectional views showing a manufacturing method of a microlens array substrate in the order of steps.

First, in a step shown in FIG. 5A, a glass substrate 11a is prepared using surface-cleaned quartz glass having an even thickness without scratches as a formation material, and a mask formation film 51a is formed on the surface of the glass substrate 11a. This mask formation film 51a functions as a mask by forming an opening thereon in the following step.

The mask formation film 51a preferably has resistance to etching. That is, an etching rate of the mask formation film 51a is significantly smaller than that of the glass substrate 11a. Therefore, examples of a material of the mask formation film 51a include metal such as Cr, Au, Ni, or Pt, alloy containing two or more kinds selected therefrom, oxide (metal oxide) of Cr, Au, Ni, or Pt, silicon, or a resin. The mask formation film may have a plurality layered structures formed of different materials such as Cu and Au or Cr oxide and Cr.

The formation method of the mask formation film 51a is not particularly limited, and an optimal method for a film material is appropriately selected from a vapor deposition method, a sputtering method, a chemical vapor deposition method (CVD method) and used. A film thickness is appropriately set by formation conditions of initial holes and etching conditions and is preferably formed to be approximately from 0.01 μm to 0.2 μm.

Figure 5B:
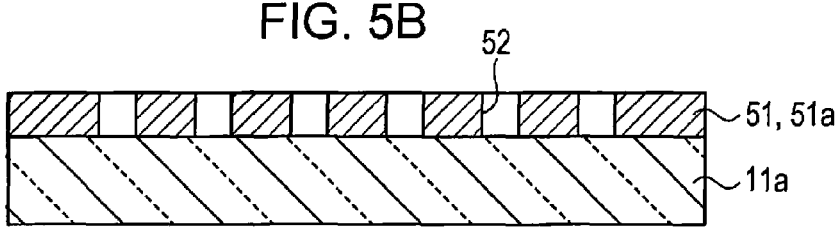

In a step shown in FIG. 5B, a mask 51 is formed. Specifically, laser irradiation or etching treatment is performed with respect to the mask formation film 51a and openings 52 are formed. In a case of the laser irradiation, it is possible to form the openings with high positional accuracy and to accurately control a gap between the adjacent openings 52. Accordingly, the formation of the mask 51 having a predetermined opening pattern is completed.

Figure 5C:
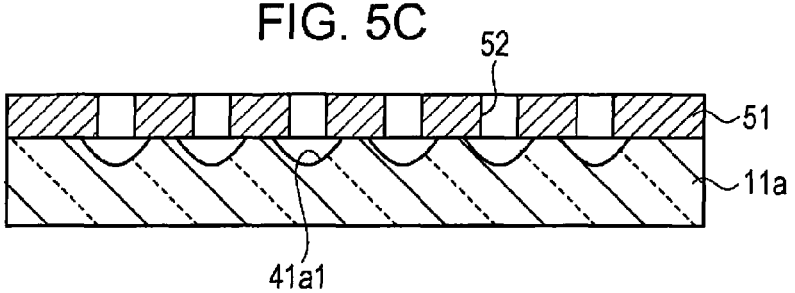

In a step shown in FIG. 5C, the first lens surfaces 41a1 are formed on the glass substrate 11a. Specifically, the etching treatment is performed with respect to the glass substrate 11a through the openings 52 formed on the mask 51 and the first lens surfaces 41a1 are formed. The etching treatment is, for example, wet etching for performing isotropic etching.

An etching solution is not particularly limited, but since the glass substrate 11a is used as the substrate in the embodiment, an etching solution (hydrofluoric acid-based etching solution) containing hydrofluoric acid (hydrogen fluoride) is preferably used. By using the hydrofluoric acid-based etching solution, it is possible to more selectively etch the glass substrate 11a and to preferably form the first lens surfaces 41a1.

Figure 5D:
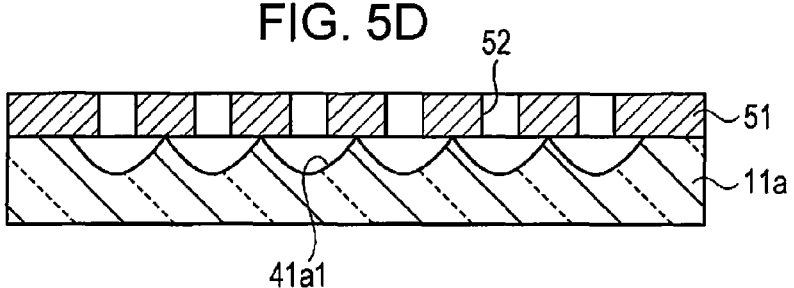

In a step shown in FIG. 5D, the formation of the first lens surfaces 41a1 having a concave shape is completed. Specifically, it is possible to form the first lens surfaces 41a1 having a predetermined depth by controlling the time of the wet etching or the like. In the embodiment, the first lens surfaces 41a1 are in a hemispherical shape so that a depth thereof is approximately the radius of the hemisphere.

Figure 5E:
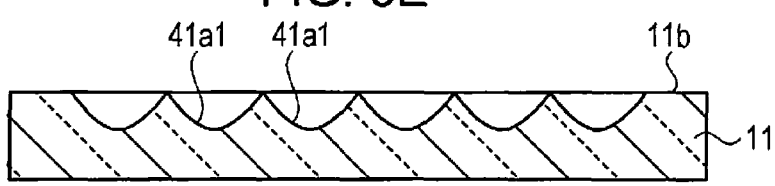

In a step shown in FIG. 5E, by removing the mask 51 by etching or the like, the light transmitting substrate 11 including the plurality of first lens surfaces 41a1 on an upper surface 11b is obtained.

Figure 6A:
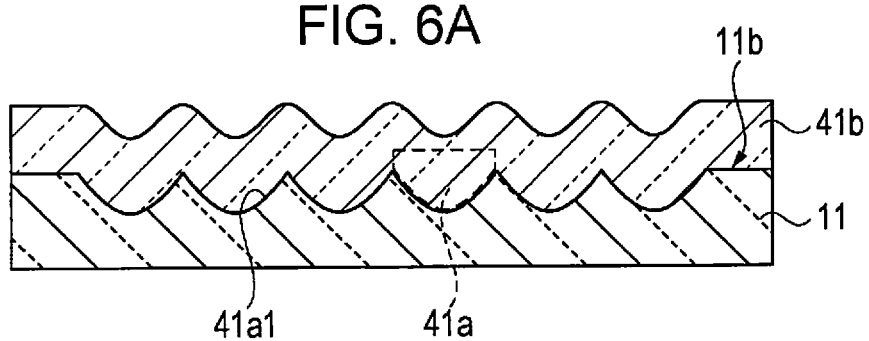
FIGS. 6A to 6D are schematic sectional views showing a manufacturing method of a microlens array substrate in the order of steps.

Next, in a step shown in FIG. 6A, the formation of a first lens layer precursor film 41b which is in a previous stage of the formation of the first lens layer 41 is completed. As a manufacturing method of the first lens layer precursor film 41b, a CVD method can be used, for example.

Figure 6B:
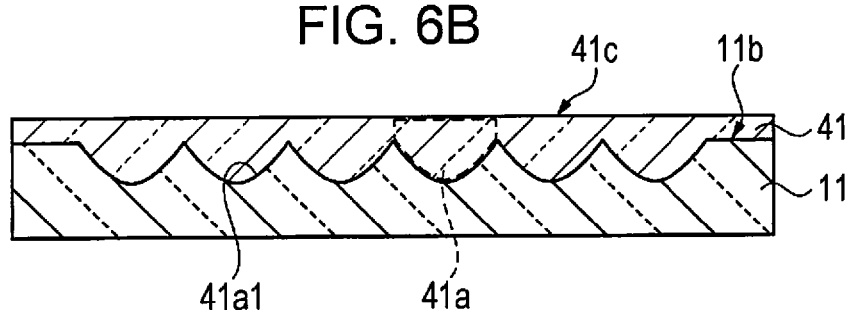

In a step shown in FIG. 6B, flattening treatment is performed for the surface of the first lens layer precursor film 41b and the first lens layer 41 having a flattened surface 41c is formed. As the flattening treatment, chemical mechanical polishing (CMP) can be used. As described above, the material of the first lens layer precursor film 41b is silicon oxynitride (SiON). By doing so, it is possible to form a plurality of lenses with high accuracy of dimension in the following manufacturing step, and accordingly, it is possible to manufacture a high quality microlens array substrate.

Since the first lens layer 41 includes a layer (first flattening layer) having a first thickness and the same refractive index as that of the first lens 41a, between the light transmitting layer 43 and the first lens 41a, it is possible to prevent the first lens 41a from being scraped, even when a large amount of the first lens layer 41 is scraped in the flattening treatment. That is, it is possible to protect the lens.

By performing the flattening treatment, it is possible to control the thickness of the first lens layer 41. The thickness of the first lens layer 41 is controlled according to the design of the microlens 31 to be formed.

Figure 6C:
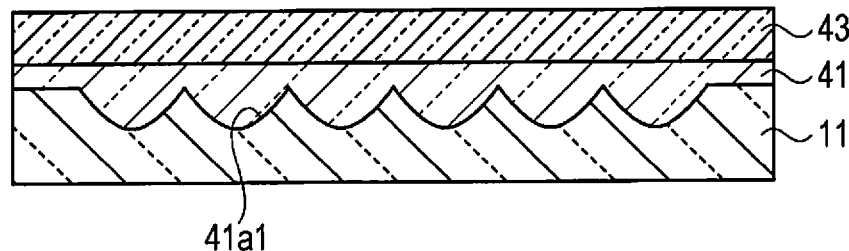

In a step shown in FIG. 6C, the light transmitting layer 43 is formed so as to cover the first lens layer 41. Specifically, the light transmitting layer 43 is silicon oxide (SiO$_2$). As a manufacturing method of the light transmitting layer 43, a CVD method can be used, for example. The refractive index of the light transmitting layer 43 is smaller than the refractive index of the first lens layer 41. Since there is an interface between the first lens layer 41 and the light transmitting layer 43, it is possible to monitor the thickness of the light transmitting layer 43. As a result, it is possible to easily adjust the thickness of the light transmitting layer 43. The thickness thereof is easily inspected in a film thickness inspection step.

Figure 6D:
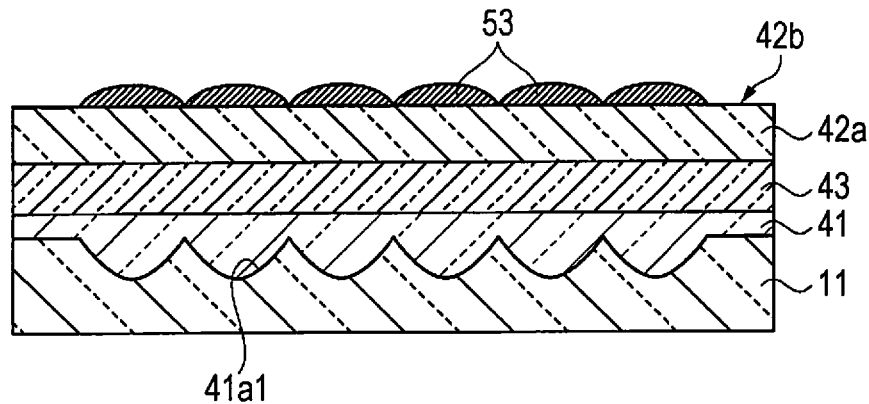

In a step shown in FIG. 6D, the second lens layer 42 is formed so as to cover the light transmitting layer 43. As a manufacturing method of the second lens layer 42, a well-known film forming technology or a photolithography method can be used, for example.

Specifically, first, a second lens layer precursor film 42a to be the second lens layer 42 is formed on the light transmitting layer 43 using the CVD method. As a manufacturing method of the second lens layer precursor film 42a, a CVD method can be used, for example. A material of the second lens layer precursor film 42a is silicon oxynitride (SiON).

After that, masks 53 corresponding to the plurality of first lens surfaces 41a1 are formed on a surface 42b of the second lens layer precursor film 42a. In FIG. 6D, the masks 53 having a convex shape on the upper portion are formed.

For example, such masks 53 can be formed by applying a positive type photoresist, performing exposure and development through a photomask having an opening pattern at positions overlapping the boundary portions of the plurality of first lens surfaces 41a1, and heating the light transmitting substrate 11, the second lens layer precursor film 42a, and the photoresist to a softening temperature of the remaining photoresist.

Figure 7A:
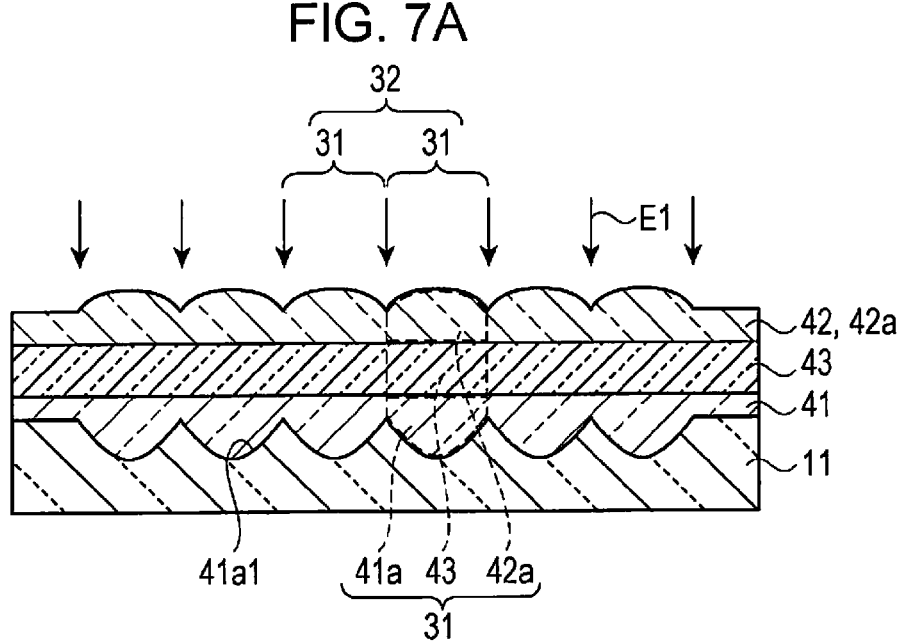
FIGS. 7A to 7C are schematic sectional views showing a manufacturing method of a microlens array substrate in the order of steps.

In a step shown in FIG. 7A, anisotropic dry etching is performed, the shape of the masks 53 is transferred to the second lens layer precursor film 42a, and the second lens layer 42 configuring the plurality of microlenses 31 is formed. The refractive index of the second lens layer 42 is greater than the refractive index of the light transmitting layer 43. As etching gas E1 used in the dry etching, fluorine-containing gas such as CF$_4$, CHF$_3$, C$_2$F$_6$, or SF$_6$ can be used, for example.

When the shape of the masks 53 is transferred to the second lens layer precursor film 42a, a layer (second flattening layer) having a second thickness and the same refractive index as that of the second lens 42a remains between the second lens 42a and the light transmitting layer 43, it is possible to reliably form the second lens 42a, even when processing variations occurs when processing the lens. That is, there is no possibility of etching of the light transmitting layer 43. Since the second flattening layer is the residue of the dry etching, it is possible to form the second lens layer 42 with excellent accuracy.

Figure 7B:
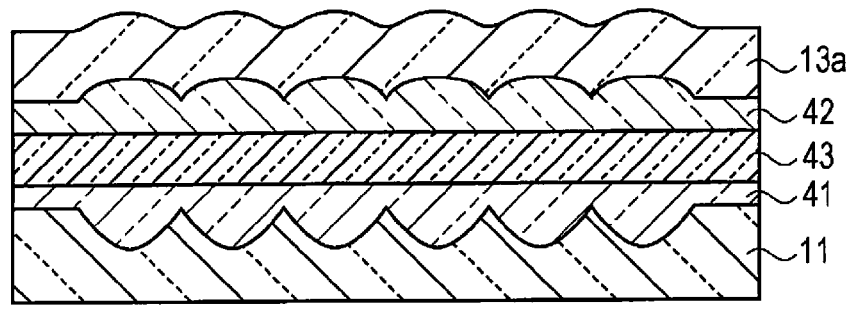

In a step shown in FIG. 7B, an inorganic material having light transmittance is laminated to cover the second lens layer 42, and a protection layer 13a is formed. As a formation material of the protection layer 13a, silicon oxide (SiO$_2$) is used, for example. As a method of forming the protection layer 13a, a CVD method can be used, for example.

Figure 7C:
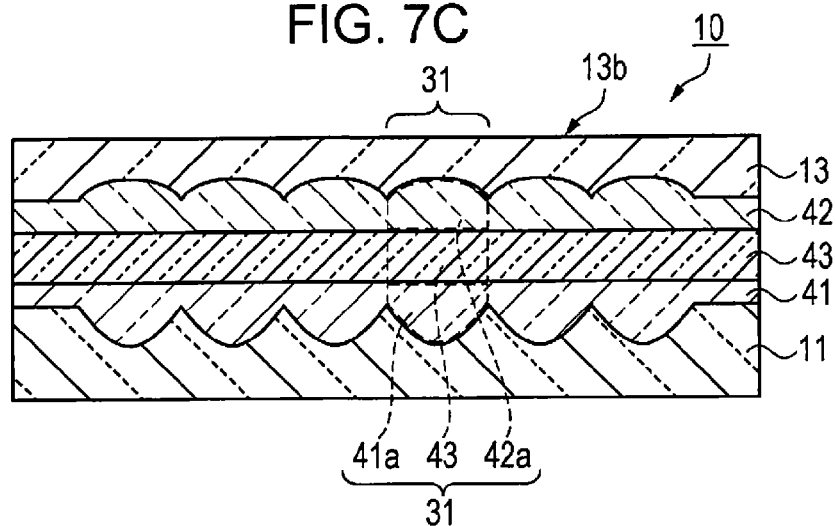

In a step shown in FIG. 7C, the flattening treatment is performed for the surface of the protection layer 13a and the protection layer 13 having a flattened surface 13b is formed. As the flattening treatment, CMP or etching can be used. By performing such an operation, it is possible to prevent diffused reflection of light or disorder in refraction on the surface 13b of the protection layer 13 and to manufacture the high quality microlens array substrate 10.

It is possible to control the thickness of the protection layer 13 by performing the flattening treatment. Accordingly, it is possible to control the distance from the surface 13b to a focal position of the microlens 31, and to collect light at a desired position of a member such as the liquid crystal panel 102 provided on the surface 13b. By performing the above-mentioned operations, the formation of the microlens array substrate 10 is completed.

According to this, it is possible to easily control the clearance between the first lens 41a and the second lens 42a by controlling the film thickness of the light transmitting layer 43.

In the embodiment, the planar shape of the microlens 31 included in the microlens array substrate 10 to be manufactured is set as a square, but there is no limitation, and the adjacent microlenses 31 may not come into contact with each other and may have independent shapes.

Configuration of Projection Type Display Apparatus

Figure 8:
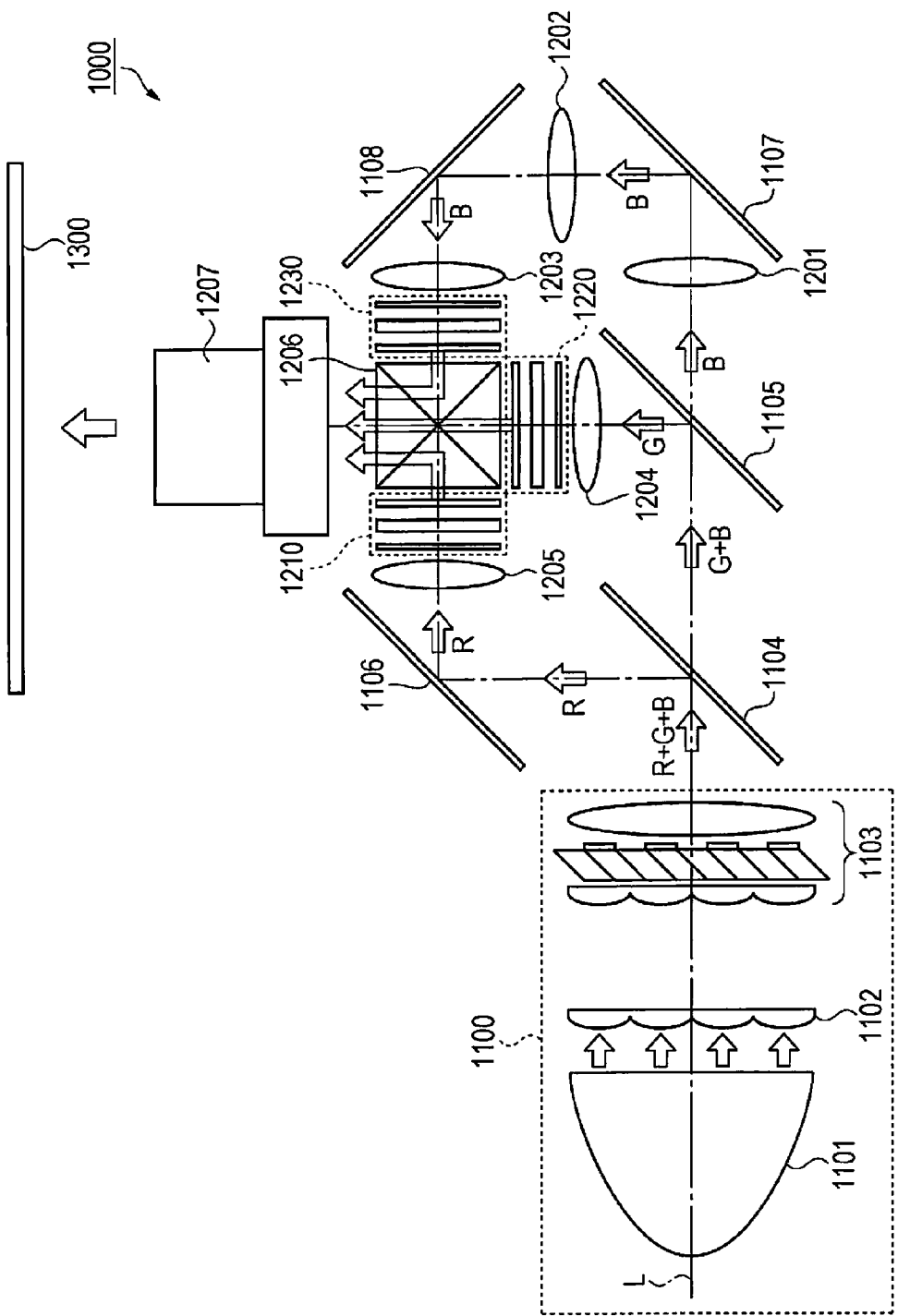
FIG. 8 is a schematic view showing a configuration of a projection type display apparatus including the liquid crystal device.

Next, a projection type display apparatus of the embodiment will be described with reference to FIG. 8. FIG. 8 is a schematic view showing a configuration of a projection type display apparatus including the liquid crystal device described above.

As shown in FIG. 8, a projection type display apparatus 1000 of the embodiment includes a polarization illumination device 1100 disposed along a system optical axis L, two dichroic mirrors 1104 and 1105 as light separation elements, three reflecting mirrors 1106, 1107, and 1108, five relay lenses 1201, 1202, 1203, 1204, and 1205, three transmission type liquid crystal light bulbs 1210, 1220, and 1230 as light modulation units, a cross dichroic prism 1206 as an optical synthesis element, and a projection lens 1207.

The polarization illumination device 1100 is schematically configured with a lamp unit 1101 which is formed of a white light source such as an ultrahigh pressure mercury lamp or a halogen lamp, an integrator lens 1102, and a polarization conversion element 1103.

The dichroic mirror 1104 reflects red light (R) and transmits green light (G) and blue light (B) from a polarized light flux emitted from the polarization illumination device 1100. Another dichroic mirror 1105 reflects the green light (G) which has transmitted the dichroic mirror 1104 and transmits the blue light (B).

The red light (R) which is reflected by the dichroic mirror 1104 is reflected by the reflecting mirror 1106 and then is incident to the liquid crystal light bulb 1210 through the relay lens 1205. The green light (G) reflected by the dichroic mirror 1105 is incident to the liquid crystal light bulb 1220 through the relay lens 1204. The blue light (B) which has transmitted the dichroic mirror 1105 is incident to the liquid crystal light bulb 1230 through a light guiding system configured with the three relay lenses 1201, 1202, and 1203 and two reflecting mirrors 1107 and 1108.

The liquid crystal light bulbs 1210, 1220, and 1230 are disposed to face each incident surface for each colored light of the cross dichroic prism 1206. The colored light incident to the liquid crystal light bulbs 1210, 1220, and 1230 is modulated based on image information (image signal) and emitted to the cross dichroic prism 1206.

In this prism, four rectangular prisms are bonded to each other and a dielectric multilayer film which reflects red light and a dielectric multilayer film which reflects blue light are formed in a cross shape on the inner surface thereof. The three colored lights are synthesized by the dielectric multilayer films and color showing a color image is synthesized. The synthesized light is projected onto a screen 1300 by the projection lens 1207 which is a projection optical system and the image is enlarged and displayed.

In the liquid crystal light bulb 1210, the liquid crystal device 100 described above is used. The liquid crystal device 100 is disposed between a pair of polarizing elements which are disposed in a cross Nicol arrangement on an incident side or an emission side of colored light, with a gap. The liquid crystal light bulbs 1220 and 1230 also have with the same configuration.

According to the projection type display apparatus 1000, since the liquid crystal light bulbs 1210, 1220, and 1230 are used, it is possible to obtain high display quality.

As described above, according to the microlens array substrate 10, the liquid crystal device 100, and the projection type display apparatus 1000 of the first embodiment, the following effects are obtained.

(1) According to the microlens array substrate 10 and the liquid crystal device 100 of the first embodiment, since the light transmitting layer 43 having a smaller refractive index and a smaller coefficient of thermal expansion than those of the first lens layer 41 and the second lens layer 42 is disposed between the first lens layer 41 and the second lens layer 42, a ray incident to the light transmitting layer 43 in an oblique direction is refracted to the oblique side, because the refractive index of the light transmitting layer is small. Accordingly, it is possible to largely curve the incident light. Therefore, it is possible to set the total film thickness of the microlens array substrate 10 to be small. Thus, it is possible to improve transmittance without lengthening the distance between the lenses. Even when it is desired to lengthen the distance between the lenses, since the distance between the lenses is adjusted by the light transmitting layer 43, it is possible to set the total film thickness of the microlens array substrate 10 to be small and to prevent the microlens array substrate 10 from being warped or deformed, compared to a case of adjusting the first lens layer 41 and the second lens layer 42 to be thick. As a result, it is possible to prevent deterioration in display quality.

(2) According to the microlens array substrate 10 and the liquid crystal device 100 of the first embodiment, since the first flattening layer and the second flattening layer are included, it is possible to prevent negative effects on the first lens 41a and the second lens 42a, even when the flattening treatment for flattening the interface is performed and when processing variations occurs at the time of the lens formation. In addition, it is possible to monitor the thickness of the light transmitting layer 43 using the interface between the first lens layer 41 and the light transmitting layer 43 and the interface between the second lens layer 42 and the light transmitting layer 43.

(3) According to the projection type display apparatus 1000 of the first embodiment, since the liquid crystal device 100 is included, it is possible to provide a projection type display apparatus which can improve display quality.

Second Embodiment

Configuration of Microlens Array Substrate

Figure 9:
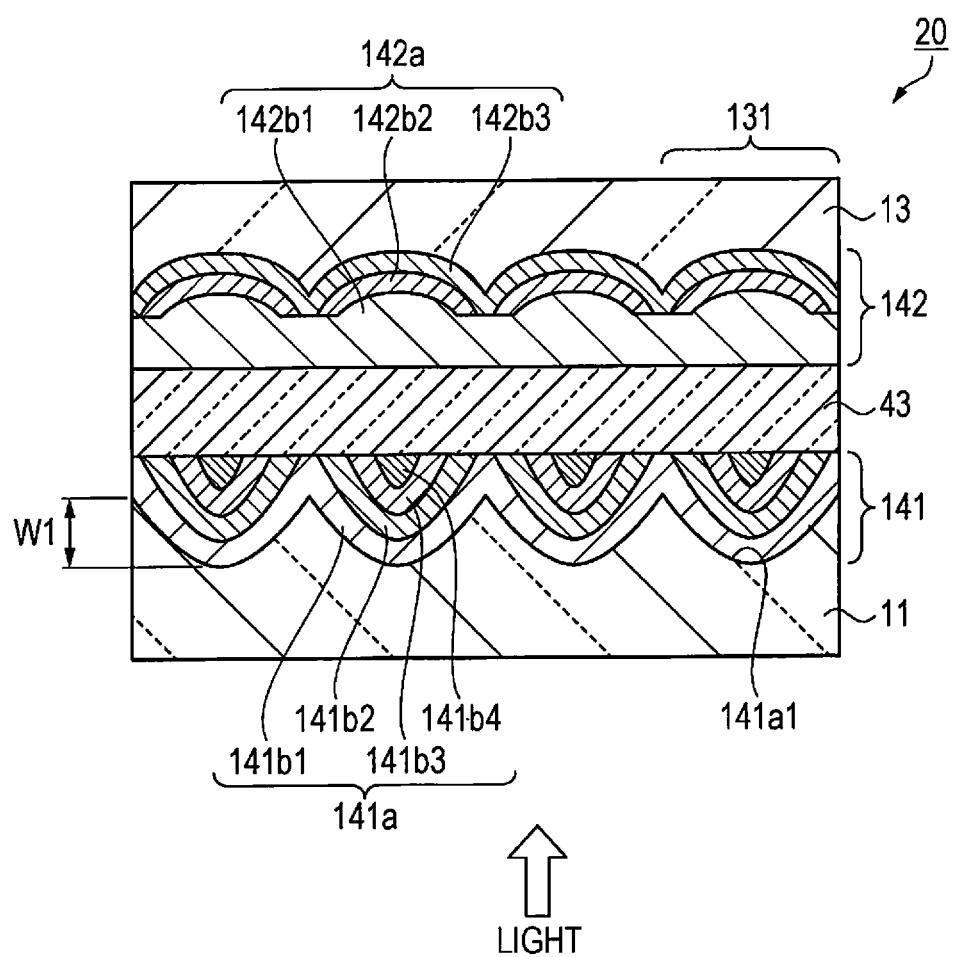
FIG. 9 is a schematic sectional view showing a configuration of a microlens array substrate of a second embodiment.

FIG. 9 is a schematic sectional view showing a configuration of a microlens array substrate of a second embodiment. Hereinafter, the configuration of the microlens array substrate will be described with reference to FIG. 9.

A microlens array substrate 20 of the second embodiment is different from the microlens array substrate 10 of the first embodiment in that the first lens 41a and the second lens 42a are laminated by a plurality of different refractive index layers, and the other parts thereof are substantially the same. Accordingly, in the second embodiment, the parts different from that of the first embodiment will be described in detail and the description of the other overlapping parts will be suitably omitted.

As shown in FIG. 9, the microlens array substrate 20 of the second embodiment includes the light transmitting substrate 11, a first lens layer 141 including a plurality of microlenses 131, the light transmitting layer 43 provided so as to cover the first lens layer 141, a second lens layer 142 provided so as to cover the light transmitting layer 43, and the protection layer 13 provided so as to cover the second lens layer 142.

In the same manner as in the first embodiment, the material of the first lens layer 141 and the second lens layer 142 is silicon oxynitride (SiON). The material of the light transmitting substrate 11, the light transmitting layer 43, and the protection layer 13 is the same as that in the first embodiment.

In the same manner as in the first embodiment, the refractive index of the light transmitting layer 43 is also a refractive index which is lower than a refractive index of the first lens layer 141 and the second lens layer 142. The refractive index of the first lens layer 141 and the second lens layer 142 is higher than the refractive index of the light transmitting substrate 11 and the refractive index of the light transmitting layer 43.

First lenses 141a configuring the first lens layer 141 are configured by laminating a plurality of lens layers having different refractive indexes. Specifically, a first lens layer 141b1, a second lens layer 141b2, a third lens layer 141b3, and a fourth lens layer 141b4 are disposed from a first lens surface 141a1 side.

A refractive index of the second lens layer 141b2 is a refractive which is lower than a refractive index of the first lens layer 141b1. A refractive index of the third lens layer 141b3 is a refractive which is lower than the refractive index of the second lens layer 141b2. A refractive index of the fourth lens layer 141b4 is a refractive which is lower than the refractive index of the third lens layer 141b3. As described above, the lens layers 141b1 to 141b4 are disposed in descending order from layers having a high refractive index to layers having a low refractive index, from the light transmitting substrate 11 side to the light transmitting layer 43 side.

In order to set each refractive index, the lens layers can be formed while changing the amount of nitrogen contained in silicon oxynitride (SiON). The thickness of each refractive index layer is, for example, from 1 μm to 3 μm. A depth W1 of the first lens surface 141a1 is, for example, approximately equal to or smaller than 10 μm.

In the same manner as in the first lenses 141a, second lenses 142a configuring the second lens layer 142 are configured by laminating a plurality of lens layers having different refractive indexes. Specifically, a first lens layer 142b1, a second lens layer 142b2, and a third lens layer 142b3 are disposed from the light transmitting layer 43 side to the protection layer 13 side.

A refractive index of the second lens layer 142b2 is a refractive which is higher than a refractive index of the first lens layer 142b1. A refractive index of the third lens layer 142b3 is a refractive which is higher than the refractive index of the second lens layer 142b2. As described above, the lens layers 142b1 to 142b3 are disposed in ascending order from layers having a low refractive index to layers having a high refractive index, from the light transmitting layer 43 side to the protection layer 13 side.

As described above, it is possible to change a proceeding direction of light to a desired direction and to increase the usage efficiency of light, by using the microlens array substrate 20 including a plurality of refractive index layers having different refractive indexes in a stepwise manner.

Manufacturing Method of Microlens Array Substrate

FIGS. 10A to 12B are schematic sectional views showing a part of a manufacturing method of the microlens array substrate of the second embodiment in the order of steps. Hereinafter, the manufacturing method of the microlens array substrate will be described with reference to FIGS. 10A to 12B. The manufacturing method of the second embodiment is the same as that in the first embodiment, regarding the steps in FIGS. 6A to 6E.

Figure 10A:
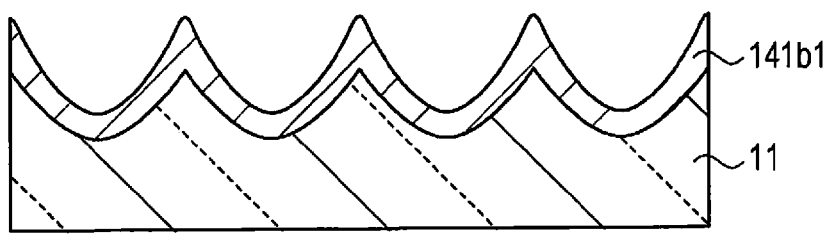
FIGS. 10A to 10D are schematic sectional views showing a part of a manufacturing method of a microlens array substrate in the order of steps.

In a step shown in FIG. 10A, the first lens layer 141b1 configuring the first lens layer 141 is formed. As a manufacturing method of the lens layer 141b1, a CVD method can be used, for example.

Figure 10B:
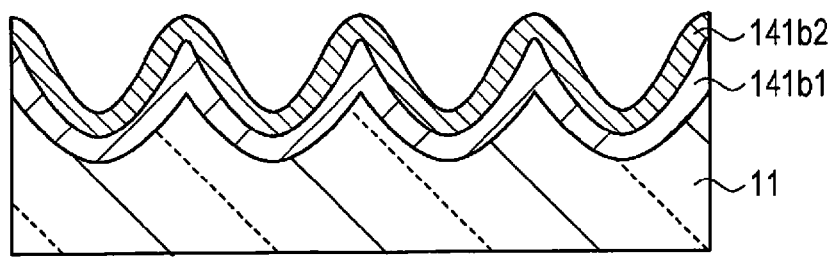

In a step shown in FIG. 10B, the second lens layer 141b2 is formed so as to cover the first lens layer 141b1. A manufacturing method of the second lens layer 141b2 is the same as the manufacturing method of the first lens layer 141b1. The refractive index of the second lens layer 141b2 is a refractive which is lower than the refractive index of the first lens layer 141b1. As the manufacturing method of the second lens layer 141b2 having a different refractive index as that of the first lens layer 141b1, it is possible to form the second lens layer while changing the amount of nitrogen contained in silicon oxynitride (SiON) which is a material used.

Figure 10C:
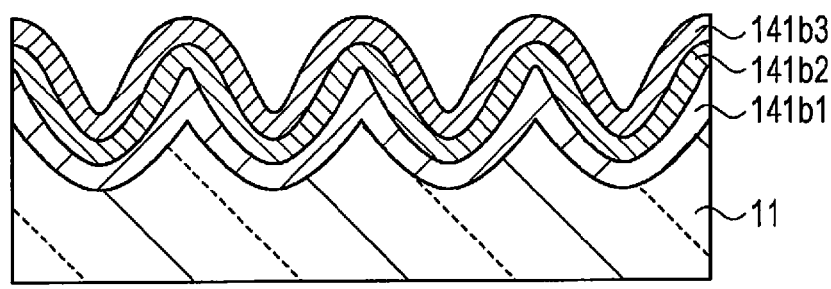

In a step shown in FIG. 10C, the third lens layer 141b3 is formed so as to cover the second lens layer 141b2. The refractive index of the third lens layer 141b3 is a refractive which is lower than the refractive index of the second lens layer 141b2. In the same manner as in a case of the second lens layer 141b2, it is possible to form the third lens layer 141b3 while changing the amount of nitrogen contained in silicon oxynitride (SiON).

Figure 10D:
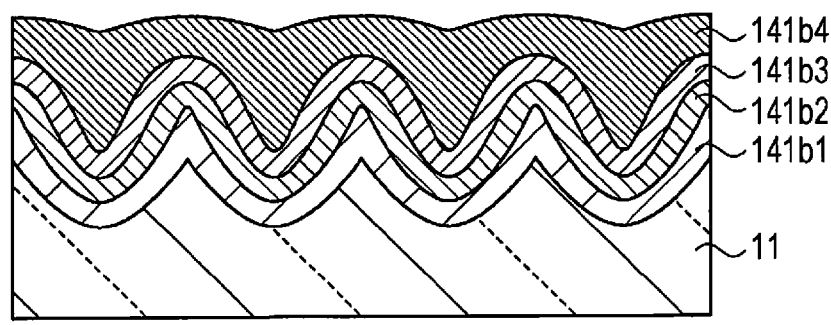

In a step shown in FIG. 10D, the fourth lens layer 141b4 is formed. The refractive index of the fourth lens layer 141b4 is a refractive which is lower than the refractive index of the third lens layer 141b3. As described above, the lens layers are formed in the order from the lens layer 141b1 having a high refractive index to the lens layer 141b4 having a low refractive index, from the side of the light transmitting substrate 11. The first lens layer 141 is configured with the four lens layers 141b1 to 141b4, but the first lens layer may be configured with a smaller number of lens layers or larger number of lens layers than the case described above.

Figure 11A:
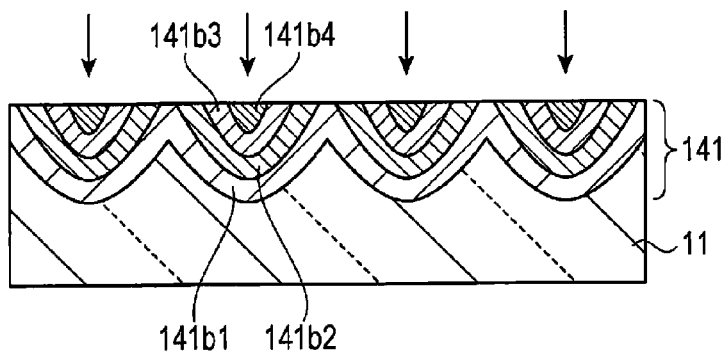
FIGS. 11A to 11D are schematic sectional views showing a part of a manufacturing method of a microlens array substrate in the order of steps.

In a step shown in FIG. 11A, flattening treatment is performed for the upper surface of the first lens layer 141 configured with the four lens layers 141b1 to 141b4. As the flattening treatment, CMP is used, for example. Accordingly, it is possible to obtain the first lens layer 141 configured with the plurality of lens layers 141b1 to 141b4 having a flattened surface. The refractive index of the light transmitting layer 43 is smaller than the refractive index of the first lens layer 141.

Figure 11B:
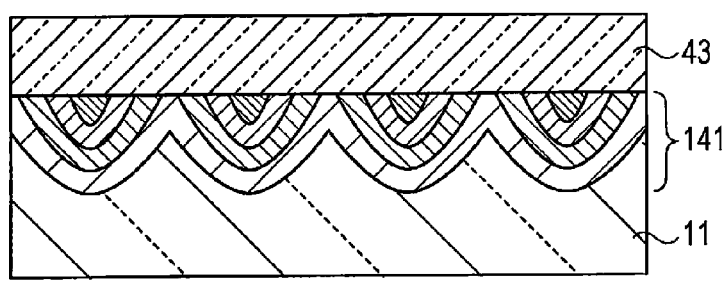

In a step shown in FIG. 11B, the light transmitting layer 43 formed of silicon oxide ($SiO_2$) is formed so as to cover the first lens layer 141, for example. The manufacturing method of the light transmitting layer 43 is the same as the manufacturing method of the first embodiment.

Figure 11C:
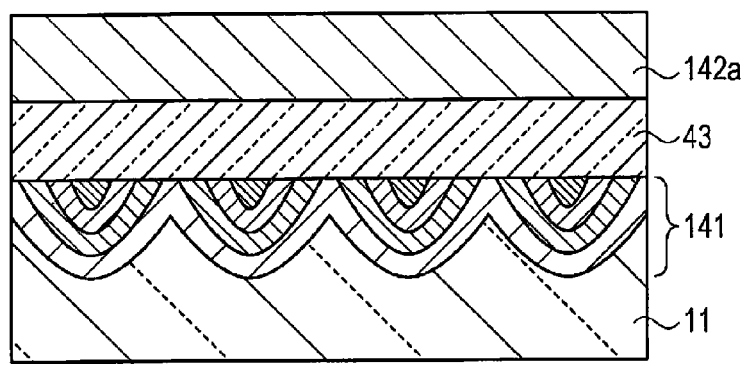

In a step shown in FIG. 11C, a second lens layer precursor film 142a which is in a previous stage of the formation of the second lens layer 142 is formed so as to cover the light transmitting layer 43. Specifically, first, the second lens layer precursor film 142a which is in a previous stage of the formation of the first lens layer 142b1 is formed on the light transmitting layer 43. A material of the second lens layer precursor film 142a is silicon oxynitride (SiON).

Figure 11D:
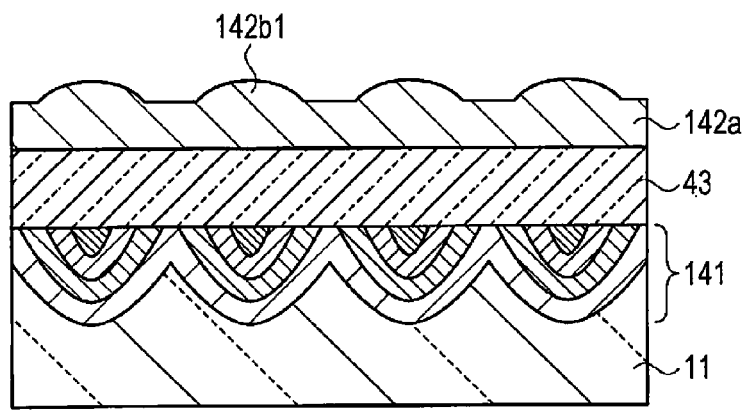

In a step shown in FIG. 11D, the first lens layer 142b1 having an approximately hemispherical shape is formed. The shape (height or the like) of the lens layer 142b1 can be adjusted by changing the time of anisotropic dry etching.

Figure 12A:
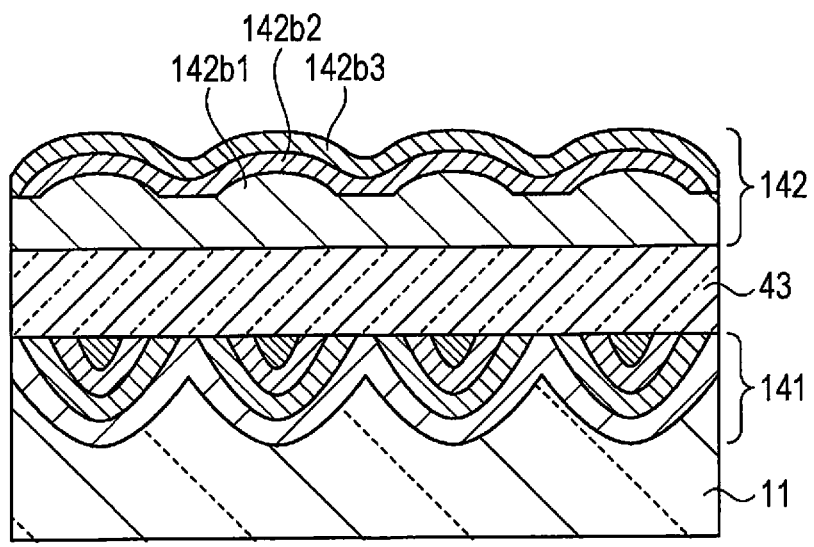
FIGS. 12A and 12B are schematic sectional views showing a part of a manufacturing method of a microlens array substrate in the order of steps.

In a step shown in FIG. 12A, the second lens layer 142b2 and the third lens layer 142b3 are formed so as to cover the first lens layer 142b1. Specifically, as a manufacturing method of the second lens layer 142b2 and the third lens layer 142b3, a CVD method can be used, for example. In the same manner as in the first lens layer 141, as the manufacturing method of the second lens layer 142b2 and the third lens layer 142b3 having a different refractive index as that of the first lens layer 142b1, it is possible to form the second and third lens layers while changing the amount of nitrogen contained in silicon oxynitride (SiON) which is a material used.

Figure 12B:
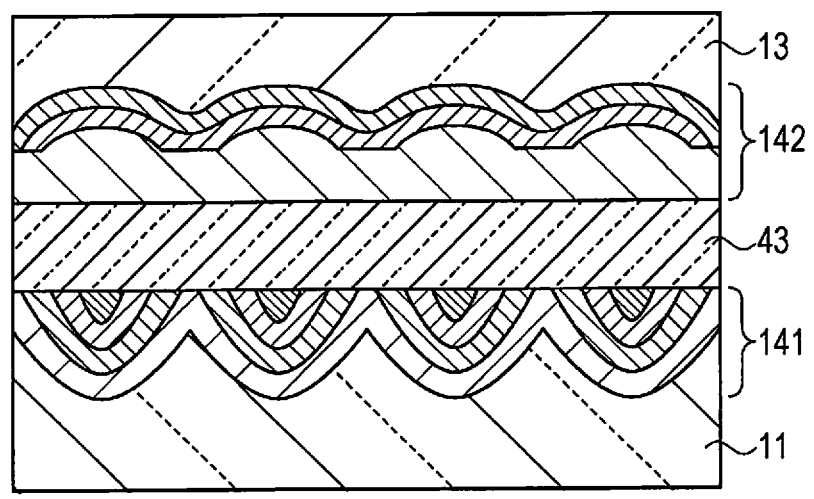

In a step shown in FIG. 12B, the protection layer 13 is formed so as to cover the second lens layer 142. The protection layer 13 is an inorganic material having light transmittance. As an inorganic material, silicon oxide ($SiO_2$) is used, for example. As a manufacturing method of the protection layer 13, a CVD method can be used, for example. After that, the flattening treatment is performed for the surface of the protection layer 13. As the flattening treatment, CMP is used, for example. Accordingly, the formation of the microlens array substrate 20 of the second embodiment is completed.

As described above, according to the microlens array substrate (liquid crystal device) 20 of the second embodiment, the following effects are obtained.

(4) According to the microlens array substrate 20 of the second embodiment, since the first lens layer 141 and the second lens layer 142 have the plurality of refractive index layers having different refractive indexes, it is possible to change a proceeding direction of light to a desired direction and to increase the usage efficiency of light.

The embodiment of the invention is not limited to the embodiments described above, but can be suitably modified within a range not departing from a gist or an idea of the invention readable from the aspects and the entire specification, and the modified embodiments are included in a range of technologies of the embodiment of the invention. The modified embodiment can be realized in the following form.

Modification Example 1

As described above, there is no limitation of using the liquid crystal device 100 as the electrooptical device, and an organic EL device, a plasma display, an electronic paper (EPD), or an imaging device such as a CCD or a CMOS may be used.

This application claims priority to Japan Patent Application No. 2014-206205 filed Oct. 7, 2014, the entire disclosures of which are hereby incorporated by reference in their entireties.

What is claimed is:

1. A microlens array substrate comprising:
a light transmitting substrate in which a first lens surface formed of a concave surface is formed on a substrate surface on one side;
a first lens layer which covers the substrate surface on one side and has a refractive index which is different from that of the light transmitting substrate;
a light transmitting layer which covers the first lens layer on the opposite side to the light transmitting substrate; and
a second lens layer which covers the light transmitting layer on the opposite side to the light transmitting substrate and in which a second lens surface formed of a convex surface is formed on the opposite side to the light transmitting substrate,
wherein the light transmitting layer has smaller refractive index and coefficient of thermal expansion than those of the first lens layer and the second lens layer, and
each of the first lens layer and the second lens layer has a plurality of refractive index layers having different refractive indexes.

2. The microlens array substrate according to claim 1, wherein the first lens layer includes a first flattening layer which has a first thickness for flattening an interface between the first lens layer and the light transmitting layer and the same refractive index as the refractive index of the first lens layer, and
the second lens layer includes a second flattening layer which has a second thickness for flattening an interface between the second lens layer and the light transmitting layer and the same refractive index as the refractive index of the second lens layer.

3. An electrooptical device comprising:
the microlens array substrate according to claim 2; and
an active matrix substrate disposed by interposing the microlens array substrate and an electrooptical layer.

4. The microlens array substrate according to claim 3, wherein curvature of the first lens surface is greater than curvature of the second lens surface.

5. An electrooptical device comprising:
the microlens array substrate according to claim 4; and
an active matrix substrate disposed by interposing the microlens array substrate and an electrooptical layer.

6. The microlens array substrate according to claim 1, wherein the plurality of refractive index layers of the first lens layer are disposed so that the refractive index decreases from the first lens surface to the light transmitting layer side, and
the plurality of refractive index layers of the second lens layer are disposed so that the refractive index decreases from the second lens surface to the light transmitting layer side.

7. An electrooptical device comprising:
the microlens array substrate according to claim 6; and
an active matrix substrate disposed by interposing the microlens array substrate and an electrooptical layer.

8. The microlens array substrate according to claim 1, wherein the side of the first lens layer is an incident side of light with respect to the side of the second lens layer.

9. An electrooptical device comprising:
the microlens array substrate according to claim 8; and
an active matrix substrate disposed by interposing the microlens array substrate and an electrooptical layer.

10. An electrooptical device comprising:
the microlens array substrate according to claim 1; and
an active matrix substrate disposed by interposing the microlens array substrate and an electrooptical layer.

11. A projection type display apparatus comprising:
the electrooptical device according to claim 10.

12. A microlens array substrate comprising:
a light transmitting substrate in which a first lens surface formed of a concave surface is formed on a substrate surface on one side;
a first lens layer which covers the substrate surface on one side and has a refractive index which is different from that of the light transmitting substrate;
a light transmitting layer which covers the first lens layer on the opposite side to the light transmitting substrate; and
a second lens layer which covers the light transmitting layer on the opposite side to the light transmitting substrate and in which a second lens surface formed of a convex surface is formed on the opposite side to the light transmitting substrate,
wherein the light transmitting layer has smaller refractive index and coefficient of thermal expansion than those of the first lens layer and the second lens layer, and the first lens layer has a plurality of refractive index layers having different refractive indexes.

13. A microlens array substrate comprising:
a light transmitting substrate in which a first lens surface formed of a concave surface is formed on a substrate surface on one side;
a first lens layer which covers the substrate surface on one side and has a refractive index which is different from that of the light transmitting substrate;
a light transmitting layer which covers the first lens layer on the opposite side to the light transmitting substrate; and
a second lens layer which covers the light transmitting layer on the opposite side to the light transmitting substrate and in which a second lens surface formed of a convex surface is formed on the opposite side to the light transmitting substrate,
wherein the light transmitting layer has smaller refractive index and coefficient of thermal expansion than those of the first lens layer and the second lens layer, and the second lens layer has a plurality of refractive index layers having different refractive indexes.

* * * * *